(12) United States Patent
Chiba et al.

(10) Patent No.: US 11,625,931 B2
(45) Date of Patent: Apr. 11, 2023

(54) INFERENCE METHOD, INFERENCE DEVICE, AND RECORDING MEDIUM

(71) Applicant: NIPPON TELEGRAPH AND TELEPHONE CORPORATION, Tokyo (JP)

(72) Inventors: Daiki Chiba, Musashino (JP); Takashi Koide, Musashino (JP); Ayako Hasegawa, Musashino (JP); Mitsuaki Akiyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 110 days.

(21) Appl. No.: 17/423,508

(22) PCT Filed: Feb. 4, 2020

(86) PCT No.: PCT/JP2020/004193
§ 371 (c)(1),
(2) Date: Jul. 16, 2021

(87) PCT Pub. No.: WO2020/170806
PCT Pub. Date: Aug. 27, 2020

(65) Prior Publication Data
US 2022/0114823 A1 Apr. 14, 2022

(30) Foreign Application Priority Data
Feb. 20, 2019 (JP) .............................. JP2019-028849

(51) Int. Cl.
*G06V 30/19* (2022.01)
*G06V 30/242* (2022.01)
*G06N 5/04* (2006.01)
*H04L 61/30* (2022.01)

(52) U.S. Cl.
CPC ......... *G06V 30/19093* (2022.01); *G06N 5/04* (2013.01); *G06V 30/242* (2022.01); *H04L 61/30* (2013.01)

(58) Field of Classification Search
CPC .. G06V 30/19093; G06V 30/242; G06N 5/04; H04L 61/30
USPC ......................................................... 382/229
See application file for complete search history.

(56) References Cited

PUBLICATIONS

Yuta Sawabe et al., Detection Method of Homograph Internationalized Domain Names with OCR, Sep. 2019, Journal of Information Processing, vol. 27 p. 536-544 (Year: 2019).*

(Continued)

*Primary Examiner* — Wednel Cadeau
(74) *Attorney, Agent, or Firm* — Xsensus LLP

(57) ABSTRACT

An inference method includes acquiring similarities between a domain name serving as an analysis object and each domain name indicated in a legitimate domain name list as feature amounts, and inferring a degree that the domain name serving as the analysis object is wrongly recognized as a legitimate domain name based on the feature amounts acquired at the acquiring and a training model that outputs, as a response to input of the feature amounts, a degree that the domain name serving as the analysis object is wrongly recognized as the legitimate domain name, by processing circuitry.

8 Claims, 12 Drawing Sheets

(56) References Cited

PUBLICATIONS

Liu et al., "A Reexamination of Internationalized Domain Names: the Good, the Bad and the Ugly", Proceedings of the 48th Annual IEEE/IFIP International Conference on Dependable Systems and Networks (DSN), 2018, pp. 654-665.

Sawabe et al., "Detecting Homograph IDNs Using OCR", Proceeding of the Asia-Pacific Advanced Network (APAN)—Research Workshop, vol. 46, 2018, pp. 56-64.

* cited by examiner

FIG.2

| SEQUENTIAL NUMBER | INPUT DOMAIN NAME |
|---|---|
| 1 | exampleログイン.test |
| 2 | êxämplē.test |
| 3 | êxämplēログイン.test |
| 4 | 例えログイン.test |
| 5 | イ列え.test |
| 6 | イ列えログイン.test |
| … | … |

FIG.3

| SEQUENTIAL NUMBER | INPUT DOMAIN NAME |
|---|---|
| 1 | example.test |
| 2 | 例え.test |
| … | … |

FIG.4

| SEQUENTIAL NUMBER | INPUT DOMAIN NAME | IMAGE CONVERSION (WHOLE CHARACTER STRING) | IMAGE CONVERSION (PARTIAL CHARACTER STRING) |
|---|---|---|---|
| 1 | exampleログイン.test | exampleログイン.test | example, ログイン |
| 2 | êxämplē.test | êxämplē.test | êxämplē |
| 3 | êxämplēログイン.test | êxämplēログイン.test | êxämplē, ログイン |
| 4 | 例えログイン.test | 例えログイン.test | 例え, ログイン |
| 5 | イ列え.test | イ列え.test | イ列え |
| 6 | イ列えログイン.test | イ列えログイン.test | イ列え, ログイン |
| … | … | … | … |

FIG.5

| SEQUENTIAL NUMBER | BRAND DOMAIN NAME | IMAGE CONVERSION (WHOLE CHARACTER STRING) | IMAGE CONVERSION (PARTIAL CHARACTER STRING) |
|---|---|---|---|
| 1 | example.test | example.test | example |
| 2 | 例え.test | 例え.test | 例え |
| … | … | … | … |

FIG.6

| SEQUENTIAL NUMBER | INPUT DOMAIN NAME | MOST SIMILAR BRAND DOMAIN NAME WHEN WHOLE CHARACTER STRING IS TAKEN INTO CONSIDERATION | SIMILARITY TO BRAND DOMAIN NAME WRITTEN ON LEFT SIDE | MOST SIMILAR BRAND DOMAIN NAME WHEN PARTIAL CHARACTER STRING IS TAKEN INTO CONSIDERATION | SIMILARITY TO BRAND DOMAIN NAME WRITTEN ON LEFT SIDE | ... |
|---|---|---|---|---|---|---|
| 1 | exampleロダイン.test | NOT AVAILABLE | NOT AVAILABLE | example.test | 1.00 | ... |
| 2 | êxamplê.test | example.test | 0.99 | example.test | 0.99 | ... |
| 3 | êxampleロダイン.test | NOT AVAILABLE | NOT AVAILABLE | example.test | 0.99 | ... |
| 4 | 例えロダイン.test | NOT AVAILABLE | NOT AVAILABLE | 例え.test | 1.00 | ... |
| 5 | 例え.test | 例え.test | 0.95 | 例え.test | 0.95 | ... |
| 6 | 例えロダイン.test | NOT AVAILABLE | NOT AVAILABLE | 例え.test | 0.95 | ... |
| ... | ... | ... | ... | ... | ... | ... |

FIG.7

| SEQUEN-TIAL NUMBER | BRAND DOMAIN NAME | DOMAIN NAME HOLDING ORGANIZATION'S NAME | COUNTRY IN WHICH DOMAIN NAME HOLDING ORGANI-ZATION IS LOCATED | POPULARITY ORDER OF NUMBER OF ACCESSES (WORLD) | POPULARITY ORDER OF NUMBER OF ACCESSES (COUNTRY) | ... |
|---|---|---|---|---|---|---|
| 1 | example.test | Example Company | UNITED STATE OF AMERICA | 1 | 1 | ... |
| 2 | 例え.test | 例えCOMPANY | JAPAN | 100 | 10 | ... |
| ... | ... | ... | ... | ... | ... | ... |

FIG.8

| SEQUENTIAL NUMBER | INPUT DOMAIN NAME | MOST SIMILAR BRAND DOMAIN NAME WHEN WHOLE CHARACTER STRING IS TAKEN INTO CONSIDERATION | POPULARITY ORDER OF BRAND DOMAIN NAME WRITTEN ON LEFT SIDE (WORLD) | POPULARITY ORDER OF BRAND DOMAIN NAME WRITTEN ON LEFT SIDE (COUNTRY) | MOST SIMILAR BRAND DOMAIN NAME WHEN PARTIAL CHARACTER STRING IS TAKEN INTO CONSIDERATION | POPULARITY ORDER OF BRAND DOMAIN NAME WRITTEN ON LEFT SIDE (WORLD) | POPULARITY ORDER OF BRAND DOMAIN NAME WRITTEN ON LEFT SIDE (COUNTRY) |
|---|---|---|---|---|---|---|---|
| 1 | example□ドメイン.test | NOT AVAILABLE | NOT AVAILABLE | NOT AVAILABLE | example.test | 1 | 1 |
| 2 | êxamplê.test | example.test | 1 | 1 | example.test | 1 | 1 |
| 3 | êxamplê□ドメイン.test | NOT AVAILABLE | NOT AVAILABLE | NOT AVAILABLE | example.test | 1 | 1 |
| 4 | 例え□ドメイン.test | NOT AVAILABLE | NOT AVAILABLE | NOT AVAILABLE | 例え.test | 100 | 10 |
| 5 | ｲ例え.test | 例え.test | 100 | 10 | 例え.test | 100 | 10 |
| 6 | ｲ例え□ドメイン.test | NOT AVAILABLE | NOT AVAILABLE | NOT AVAILABLE | 例え.test | 100 | 10 |
| ⋮ | ⋮ | ⋮ | ⋮ | ⋮ | ⋮ | ⋮ | ⋮ |

FIG.9

| SEQUENTIAL NUMBER | TOP-LEVEL DOMAIN | TYPE |
|---|---|---|
| 1 | .com | Legacy gTLD |
| 2 | .test | Legacy gTLD |
| ... | ... | ... |
| 101 | .top | New gTLD |
| 102 | .xyz | New gTLD |
| ... | ... | ... |

FIG.10

| SEQUENTIAL NUMBER | INPUT DOMAIN NAME | TOP-LEVEL DOMAIN OF INPUT DOMAIN NAME | TOP-LEVEL DOMAIN TYPE OF INPUT DOMAIN NAME | MOST SIMILAR BRAND DOMAIN NAME WHEN WHOLE CHARACTER STRING IS TAKEN INTO CONSIDERATION | TOP-LEVEL DOMAIN OF BRAND DOMAIN NAME WRITTEN ON LEFT SIDE | TOP-LEVEL DOMAIN TYPE OF BRAND DOMAIN NAME WRITTEN ON LEFT SIDE | MOST SIMILAR BRAND DOMAIN NAME WHEN PARTIAL CHARACTER STRING IS TAKEN INTO CONSIDERATION | TOP-LEVEL DOMAIN OF BRAND DOMAIN NAME WRITTEN ON LEFT SIDE | TOP-LEVEL DOMAIN TYPE OF BRAND DOMAIN NAME WRITTEN ON LEFT SIDE | |
|---|---|---|---|---|---|---|---|---|---|---|
| 1 | exampleロダイン.test | .test | Legacy gTLD | NOT AVAILABLE | NOT AVAILABLE | NOT AVAILABLE | example.test | .test | Legacy gTLD | ⋮ |
| 2 | êxämplê.test | .test | Legacy gTLD | example.test | .test | Legacy gTLD | example.test | .test | Legacy gTLD | ⋮ |
| 3 | êxämpleロダイン.test | .test | Legacy gTLD | NOT AVAILABLE | NOT AVAILABLE | NOT AVAILABLE | example.test | .test | Legacy gTLD | ⋮ |
| 4 | 例え口ダイン.test | .test | Legacy gTLD | NOT AVAILABLE | NOT AVAILABLE | NOT AVAILABLE | 例え.test | .test | Legacy gTLD | ⋮ |
| 5 | イ例え.test | .test | Legacy gTLD | 例え.test | .test | Legacy gTLD | 例え.test | .test | Legacy gTLD | ⋮ |
| 6 | イ例え口ダイン.test | .test | Legacy gTLD | NOT AVAILABLE | NOT AVAILABLE | NOT AVAILABLE | 例え.test | .test | Legacy gTLD | ⋮ |
| ⋮ | ⋮ | ⋮ | ⋮ | ⋮ | ⋮ | ⋮ | ⋮ | ⋮ | ⋮ | ⋮ |

FIG.11

| SEQUENTIAL NUMBER | INPUT DOMAIN NAME | TOP-LEVEL DOMAIN OF INPUT DOMAIN NAME | TOP-LEVEL DOMAIN TYPE OF INPUT DOMAIN NAME | SIMILARITY TO MOST SIMILAR BRAND NAME WHEN WHOLE CHARACTER STRING IS TAKEN INTO CONSIDERATION | POPULARITY ORDER OF MOST SIMILAR BRAND NAME WHEN WHOLE CHARACTER STRING IS TAKEN INTO CONSIDERATION (WORLD) | POPULARITY ORDER OF MOST SIMILAR BRAND NAME WHEN WHOLE CHARACTER STRING IS TAKEN INTO CONSIDERATION (COUNTRY) | TOP-LEVEL DOMAIN OF MOST SIMILAR BRAND NAME WHEN WHOLE CHARACTER STRING IS TAKEN INTO CONSIDERATION | TOP-LEVEL DOMAIN TYPE OF MOST SIMILAR BRAND NAME WHEN WHOLE CHARACTER STRING IS TAKEN INTO CONSIDERATION | SIMILARITY TO MOST SIMILAR BRAND NAME WHEN PARTIAL CHARACTER STRING IS TAKEN INTO CONSIDERATION | POPULARITY ORDER OF MOST SIMILAR BRAND NAME WHEN PARTIAL CHARACTER STRING IS TAKEN INTO CONSIDERATION (WORLD) | POPULARITY ORDER OF MOST SIMILAR BRAND NAME WHEN PARTIAL CHARACTER STRING IS TAKEN INTO CONSIDERATION (COUNTRY) | TOP-LEVEL DOMAIN OF MOST SIMILAR BRAND NAME WHEN PARTIAL CHARACTER STRING IS TAKEN INTO CONSIDERATION | TOP-LEVEL DOMAIN TYPE OF MOST SIMILAR BRAND NAME WHEN PARTIAL CHARACTER STRING IS TAKEN INTO CONSIDERATION | ... |
|---|---|---|---|---|---|---|---|---|---|---|---|---|---|---|
| 1 | exampleロケ゛イン.test | .test | Legacy gTLD | NOT AVAILABLE | NOT AVAILABLE | NOT AVAILABLE | NOT AVAILABLE | NOT AVAILABLE | 1.00 | 1 | 1 | .test | Legacy gTLD | ... |
| 2 | éxämplê.test | .test | Legacy gTLD | 0.99 | 1 | 1 | .test | Legacy gTLD | 0.99 | 1 | 1 | .test | Legacy gTLD | ... |
| 3 | éxämplêロケ゛イン.test | .test | Legacy gTLD | NOT AVAILABLE | NOT AVAILABLE | NOT AVAILABLE | NOT AVAILABLE | NOT AVAILABLE | 0.99 | 1 | 1 | .test | Legacy gTLD | ... |
| 4 | 例えロケ゛イン.test | .test | Legacy gTLD | NOT AVAILABLE | NOT AVAILABLE | NOT AVAILABLE | NOT AVAILABLE | NOT AVAILABLE | 1.00 | 100 | 10 | .test | Legacy gTLD | ... |
| 5 | イ例え.test | .test | Legacy gTLD | 0.95 | 100 | 10 | .test | Legacy gTLD | 0.95 | 100 | 10 | .test | Legacy gTLD | ... |
| 6 | イ例えロケ゛イン.test | .test | Legacy gTLD | NOT AVAILABLE | NOT AVAILABLE | NOT AVAILABLE | NOT AVAILABLE | NOT AVAILABLE | 0.95 | 100 | 10 | .test | Legacy gTLD | ... |
| ... | ... | ... | ... | ... | ... | ... | ... | ... | ... | ... | ... | ... | ... | ... |

FIG.12

| SEQUEN-TIAL NUMBER | DOMAIN NAME | NUMBER OF INVESTIGATED USERS | NUMBER OF USERS WHO WRONGLY RECOGNIZED DOMAIN NAME AS SIMILAR BRAND NAME | RATIO OF USERS WHO WRONGLY RECOGNIZE |
|---|---|---|---|---|
| 1 | exampleログイン.test | 100 | 70 | 0.7 |
| 2 | êxämplē.test | 100 | 90 | 0.9 |
| 3 | êxämplēログイン.test | 100 | 40 | 0.4 |
| … | … | … | … | … |

FIG.13

| SEQUENTIAL NUMBER | DOMAIN NAME | PROBABILITY OF WRONG RECOGNITION |
|---|---|---|
| 1 | 例えログイン.test | 0.6 |
| 2 | ｲ列え.test | 0.8 |
| 3 | ｲ列えログイン.test | 0.2 |
| … | … | … |

INFERENCE METHOD, INFERENCE DEVICE, AND RECORDING MEDIUM

CROSS-REFERENCE TO RELATED APPLICATIONS

The present application is based on PCT filing PCT/JP2020/004193, filed Feb. 4, 2020, which claims priority to JP 2019-028849, filed Feb. 20, 2019, the entire contents of each are incorporated herein by reference.

TECHNICAL FIELD

The present invention relates to an inference method, an inference device, and a recording medium.

BACKGROUND ART

Domain names are indispensable assets for Internet service providers. Originally, the Internet was designed not to distinguish borders and languages. However, for the domain names, only English (ASCII characters, digits, and hyphens) was allowed to be used initially. After some times, internationalized domain manes (IDNs) were standardized and implemented, and hence characters (Unicode characters) other than English were allowed to be used as domain names.

Attackers who perform cyberattacks create domain names that are visually similar to those used in legitimate services by abusing IDN characteristics to perform the attacks.

The attackers aim to trick users into wrongly recognizing the created domain names as legitimate brand domain names. This type of attack is called an IDN homograph attack. Many examples of the attack have been reported. For example, it was demonstrated that a phishing site can be made that has a registered IDN visually similar to the domain name of a famous company with a secure sockets layer (SSL) certificate, and is extremely hard to be distinguished from the genuine one in appearance. For another example, it was found that the IDN visually similar to the domain name of another famous company distributed, as the software provided by the company, false software including malicious software (malware).

CITATION LIST

Non Patent Literature

Non Patent Literature 1: B. Liu, C. Lu, Z. Li, Y. Liu, H. Duan, S. Hao, and Z. Zhang, "A Reexamination of Internationalized Domain Names: the Good, the Bad and the Ugly," Proceedings of the 48th Annual IEEE/IFIP International Conference on Dependable Systems and Networks (DSN), pp. 654-665, 2018.

Non Patent Literature 2: Y. Sawabe, D. Chiba, M. Akiyama, and S. Goto, "Detecting Homograph IDNs Using OCR," Proceeding of the Asia-Pacific Advanced Network (APAN) Research Workshop 2018, vol. 46, pp. 56-64, 2018.

SUMMARY OF THE INVENTION

Technical Problem

For detecting domain names visually similar to those used in legitimate services, which are typified as the IDN homograph attacks, methods have been proposed (refer to Non Patent Literature 1 and 2). The method described in Non Patent Literature 1 measures a visual similarity between the IDN to be surveyed and an English brand domain name by a structural similarity (SSIM) index, which is the similarity index between images, and determines that the IDN is a false domain name when the index is equal to or larger than a predetermined threshold. The method described in Non Patent Literature 2 identifies an ASCII character similar to a non-ASCII character included in the IDN to be surveyed by utilizing optical character recognition (OCR) to identify the target English brand domain name the IDN is intended to be similar to.

Both methods described in Non Patent Literature 1 and 2, however, cannot obtain a degree that a user wrongly recognizes the IDN as the genuine brand domain name. The methods described in Non Patent Literature 1 and 2 handle, as detection objects, only the IDNs generated by partial replacement of characters of the brand domain names.

In view of such problems described above, the invention is made and aims to provide an inference method, an inference device, and an inference program that can infer a degree that a user wrongly recognizes, as a legitimate domain name, an arbitrary domain name serving as an analysis object.

Means for Solving the Problem

In order to solve the above problem and achieve a goal, an inference method according to the present invention is an inference method including: acquiring similarities between a domain name serving as an analysis object and each domain name indicated in a legitimate domain name list as feature amounts; and inferring a degree that the domain name serving as the analysis object is wrongly recognized as a legitimate domain name based on the feature amounts acquired at the acquiring and a training model that outputs, as a response to input of the feature amounts, a degree that the domain name serving as the analysis object is wrongly recognized as the legitimate domain name, by processing circuitry.

Effects of Invention

The invention can infer a degree that a user wrongly recognizes, as a legitimate domain name, an arbitrary domain name serving as an analysis object.

BRIEF DESCRIPTION OF DRAWINGS

FIG. 2 is a diagram illustrating examples of domain names that serve as analysis objects and are to be input into a domain name input unit.

FIG. 3 is a diagram illustrating an example of a brand domain name list to be input into a brand domain name list input unit.

FIG. 4 is a diagram illustrating examples of converted images of character strings representing input domain names.

FIG. 5 is a diagram illustrating examples of the images of the character strings representing the domain names in the brand domain name list.

FIG. 6 is a diagram illustrating similarities between the converted image of the character string representing the input domain name and the converted images of the character strings each representing the domain name in the brand domain name list.

FIG. 7 is a diagram illustrating examples of evaluation information about the brand domain names.

FIG. 8 is a diagram illustrating the brand domain names identified to be visually most similar to the input domain names and popularity orders of the identified brand domain names.

FIG. 9 is a diagram illustrating examples of types of top-level domains.

FIG. 10 is a diagram illustrating examples of calculating a domain name hierarchy based feature amount from the input domain name.

FIG. 11 is a diagram illustrating examples of integration of the feature amounts acquired by the feature amount acquisition unit from the input domain name.

FIG. 12 is a diagram illustrating examples of training data.

FIG. 13 is a diagram illustrating examples of calculating a probability that a user wrongly recognizes test data (input domain name) as a brand domain name.

DESCRIPTION OF EMBODIMENTS

Figure 1:
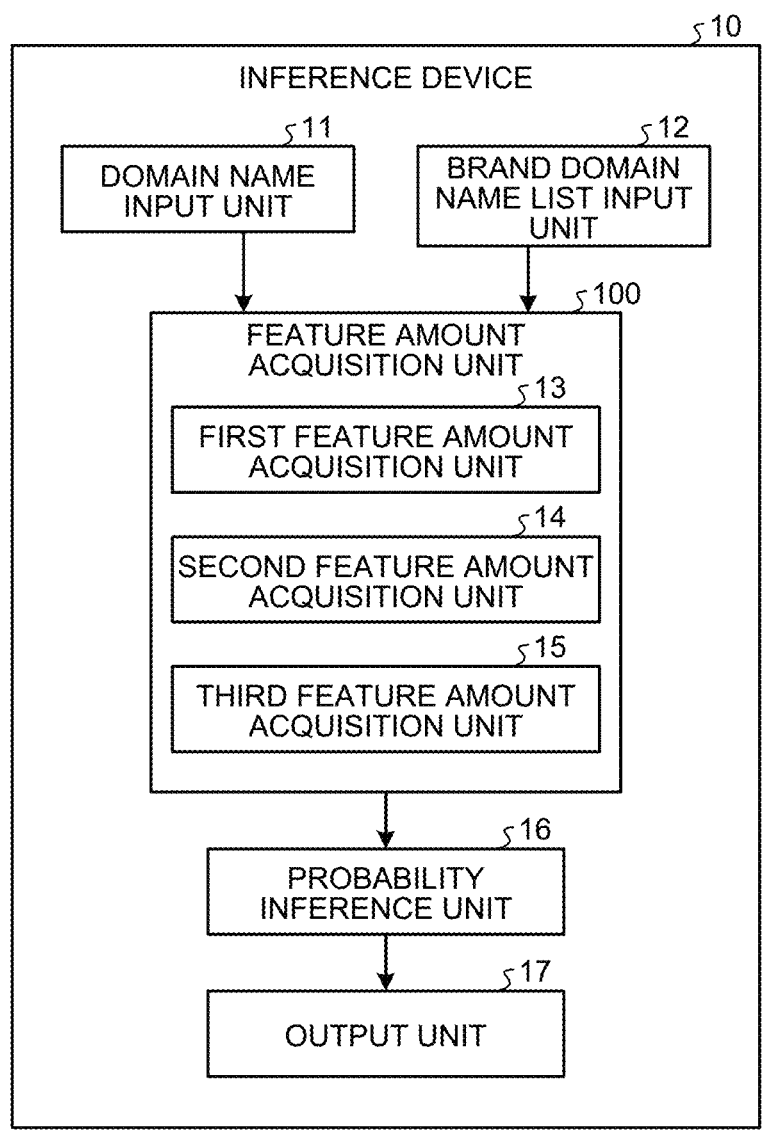
FIG. 1 is a diagram illustrating a schematic structure of an inference device according to an embodiment.

The following describes an embodiment of the invention in detail with reference to the accompanying drawings. The following embodiment does not limit the invention. Portions identical to each other are provided with the same numeral in the drawings.

Embodiment

FIG. 1 is a diagram illustrating a schematic structure of an inference device according to the embodiment. An inference device 10 illustrated in FIG. 1 is an inference device that infers a degree that a user wrongly recognizes, as a brand domain name (legitimate domain name), an arbitrary domain name serving as an analysis object. The inference device 10 has a domain name input unit 11, a brand domain name list input unit 12, a feature amount acquisition unit 100 (the acquisition unit), a probability inference unit (the inference unit) 16, and an output unit 17. The inference device 10 is achieved as follows: a computer that includes a read only memory (ROM), a random access memory (RAM), a central processing unit (CPU), and the like reads a certain program and the CPU executes the certain program, for example.

The domain name input unit 11 receives input of a domain name serving as the analysis object. FIG. 2 is a diagram illustrating examples of domain names that serve as the analysis objects and are to be input into the domain name input unit 11. For example, "example ログイン .test" in the sequential number "1" in FIG. 2 is the input domain name.

The brand domain name list input unit 12 receives input of a brand domain name list in which legitimate brand names are listed. FIG. 3 is a diagram illustrating an example of the brand domain name list to be input into the brand domain name list input unit 12. For example, the sequential number "1" in FIG. 3 illustrates the brand domain name "example.test."

The feature amount acquisition unit 100 acquires similarities between the domain name serving as the analysis object (hereinafter, described as the input domain name) input from the domain name input unit 11 and each domain name indicated in the brand domain name list input from the brand domain name list input unit 12, as feature amounts. The feature amount acquisition unit 100 acquires the whole or a part of a visual similarity based feature amount, a brand information (legitimate information) based feature amount, and a domain name hierarchy based feature amount from combinations of the input domain name and each domain name in the brand domain name list. The feature amount acquisition unit 100 has a first feature amount acquisition unit 13 (the first acquisition unit), a second feature amount acquisition unit 14 (the second acquisition unit), and a third feature amount acquisition unit 15 (the third acquisition unit).

The first feature amount acquisition unit 13 calculates similarities between a first image and a group of second images, the first image being converted from at least a part of a character string representing the input domain name, the second image being converted from at least a part of the character string representing the domain name in the brand domain name list. The first feature amount acquisition unit 13 acquires the brand domain name corresponding to the highest similarity in the similarities as the brand domain name that is visually most similar to the input domain name. The first feature amount acquisition unit 13 acquires the highest similarity in the similarities as the visual similarity based feature amount of the input domain name.

FIG. 4 is a diagram illustrating examples of the converted images of character strings representing the input domain names. FIG. 4 illustrates examples in each of which the whole character string of the input domain name is subjected to image conversion without any change, and examples in each of which the character string of the character string of the input domain name is subjected to word segmentation based on lexical analysis, which is typical natural language processing, to be divided into partial character strings, and the partial character strings are subjected to the image conversion.

In the example with the sequential number "1" in FIG. 4, the first feature amount acquisition unit 13 performs image conversion on the whole of the character string representing the input domain name "example ログイン .test" to prepare the image "example ログイン .test." In the example with the sequential number "1" in FIG. 4, the portion excluding the top-level domain ".test" in the input domain name "example ログイン .test" has a difference in language between the English word "example" and the Japanese word "ログイン ." The first feature amount acquisition unit 13 divides the character string between the two words into partial character strings to prepare the two images "example" and "ログイン ." In this way, the first feature amount acquisition unit 13 prepares the image converted from the whole of the character string without any change or the image converted from only a part of the character string.

FIG. 5 is a diagram illustrating examples of the images of the character strings representing the domain names in the brand domain name list. FIG. 5 illustrates examples in which the whole character string of the brand domain name is converted into the image without any change for each domain name in the brand domain name list, and examples in which the character string of the brand domain name is subjected to word segmentation based on lexical analysis, which is typical natural language processing, to be divided into a partial character string, and the partial character string is subjected to the image conversion for each domain name in the brand domain name list.

In the example with the sequential number "1" in FIG. 5, the first feature amount acquisition unit 13 performs image conversion on the whole of the character string of the brand domain name "example.test" to prepare the image "example.test." In the example with the sequential number "1" in FIG. 5, the first feature amount acquisition unit 13 performs partial character string division on the portion excluding the top-level domain ".test" of the brand domain name "example.test" to prepare the image "example." In this way, the first feature amount acquisition unit 13 prepares the image converted from the whole character string without any change or the image converted from only a part of the character string for each domain name in the brand domain name list.

FIG. 6 is a diagram illustrating the similarities between the converted image of the character string representing the input domain name and the converted images of the character strings each representing the domain name in the brand domain name list. The first feature amount acquisition unit 13 calculates the similarity between each of the images of the whole character strings of the input domain names, which are exemplarily illustrated in FIG. 4, and each of the images of the whole character strings of the brand domain names, which are exemplarily illustrated in FIG. 5. The first feature amount acquisition unit 13 enters the brand domain name corresponding to the highest similarity in the calculated similarities into the "most similar brand domain name when whole character string is taken into consideration" column in FIG. 6, and enters the similarity into the "similarity to the brand domain name written on left side" column on the right side of the "most similar brand domain name when whole character string is taken into consideration" column.

The first feature amount acquisition unit 13 calculates the similarity between each of the images of the partial character strings of the input domain names, which are exemplarily illustrated in FIG. 4, and each of the images of the partial character strings of the brand domain names, which are exemplarily illustrated in FIG. 5. The first feature amount acquisition unit 13 enters the brand domain name corresponding to the highest similarity in the calculated similarities into the "most similar brand domain name when partial character string is taken into consideration" column in FIG. 6, and enters the similarity into the "similarity to brand domain name written on left side" column on the right side of the "most similar brand domain name when partial character string is taken into consideration" column.

The first feature amount acquisition unit 13 uses a structural similarity (SSIM) index, which is a similarity index between images, as a technique to calculate the similarity between images, for example. The SSIM index generally indicates the similarity between two images and is represented with a continuous value from 0.0 to 1.0. As the value is closer to 1.0, the two images are more similar to each other.

As for the similarity between the images of the domain name character strings serving as the analysis objects, only the character strings considerably similar to each other need to be considered. The first feature amount acquisition unit 13, thus, sets the threshold of the SSIM index to be equal to or larger than 0.95, for example. The first feature amount acquisition unit 13 employs the similarity as the feature amount only when the SSIM index is equal to or larger than 0.95 (refer to FIG. 6).

For example, as for the example with the sequential number "1" in FIG. 6, no domain name having the similarity larger than the threshold 0.95 exists in the brand domain names in FIG. 5 with respect to the input domain name "example ログイン .test" when the whole character string is taken into consideration. As a result, in the example with the sequential number "1" in FIG. 6, the "most similar brand domain name when the whole character string is taken into consideration" is "not available," and the similarity to the most similar brand domain name is also "not available." On the other hand, as for the example with the sequential number "1" in FIG. 6, when the partial character string is taken into consideration, the partial character string "example" extracted from the input domain name and the partial character string "example" extracted in the sequential number "1" in FIG. 5 completely coincide with each other. As a result, in the example with the sequential number "1" in FIG. 6, the brand domain name "example.test" is selected as the most similar brand domain name and the similarity "1.00" is adopted as the feature amount. The first feature amount acquisition unit 13 may use techniques other than the SSIM index as the technique to calculate the similarity between images.

The first feature amount acquisition unit 13 acquires, as the visual similarity based feature amount, one of or both of the similarity to the brand domain name visually most similar to the input domain name when the whole character string is taken into consideration and the similarity to the brand domain name visually most similar to the input domain name when the partial character string is taken into consideration.

The second feature amount acquisition unit 14 extracts evaluation information about the brand domain name visually most similar to the input domain name from external public information. The second feature amount acquisition unit 14 acquires the extracted evaluation information as the brand information based feature amount.

FIG. 7 is a diagram illustrating examples of the evaluation information about the brand domain names. As illustrated in FIG. 7, for example, in the example with the sequential number "1," the domain name holding organization's name is "Example Company," the country in which the domain name holding organization is located is "United State of America," the popularity order of the number of accesses to the domain name in the world is "1," and the popularity order of the number of accesses to the domain name in the country is "1," and those are associated with the brand domain name "example.test." The second feature amount acquisition unit 14 externally acquires the evaluation information about the brand domain names such as those exemplarily illustrated in FIG. 7.

The second feature amount acquisition unit 14 can acquire such information from a plurality of information sources. For example, the second feature amount acquisition unit 14 can acquire such information from Alexa Topsites (https://www.alexa.com/topsites) provided by Alexa International, Inc.

FIG. 8 is a diagram illustrating the brand domain names identified to be visually most similar to the input domain names and their popularity orders. With reference to FIG. 8, an example is described in which the second feature amount acquisition unit 14 calculates the feature amount based on the brand information corresponding to the input domain name. The second feature amount acquisition unit 14 refers to the brand domain name evaluation information (refer to FIG. 7) and extracts, as the feature amount, the popularity order corresponding to the brand domain name (refer to FIG. 6) identified to be visually most similar to the input domain name, the brand domain name being acquired by the first feature amount acquisition unit 13.

For example, as illustrated in the example with the sequential number "1" in FIG. 8, the brand domain name similar to the input domain name "exampleログイン.test" is not available when the whole character string is taken into consideration, the "popularity order of the brand domain name (in the world)" is "not available," and the "popularity order of the brand domain name written on the left side (in the country)" is also "not available." On the other hand, as illustrated in the example with the sequential number "1" in FIG. 8, "example.test" is identified as the most similar brand domain name when the partial character string is taken into consideration. As a result, as illustrated in the example with the sequential number "1" in FIG. 8, the second feature amount acquisition unit 14 identifies that the "popularity order of the brand domain name (in the world)" is "1," and the "popularity order of the brand domain name written on the left side (in the country)" is "1," in association with the brand domain name, based on the evaluation information illustrated in FIG. 7.

The third feature amount acquisition unit 15 acquires, as the domain name hierarchy based feature amount, type information about the top-level domain extracted from the input domain name and the type information about the top-level domain extracted from the brand domain name visually most similar to the input domain name. The third feature amount acquisition unit 15 identifies and extracts the top-level domains from both of the input domain name and the brand domain name identified to be visually most similar to the input domain name in consideration of the domain name hierarchy. The third feature amount acquisition unit 15 extracts the types of the extracted top-level domains and acquires the whole or part of the extracted information as the hierarchy based feature amount of the input domain name.

FIG. 9 is a diagram illustrating type examples of the top-level domains. The example with the sequential number "1" in FIG. 9 illustrates that the top-level domain ".com" is classified as the "Legacy gTLD." The example with the sequential number "101" in FIG. 9 illustrates that the top-level domain ".top" is classified as the "New gTLD."

The gTLD (generic top-level domain), which is the top-level domain assigned to a specific region or field, is enacted by Internet corporation for assigned names and numbers (ICANN), which is a nonprofit organization.

ICANN started a system that invites and enacts new gTLDs in 2013. As a result, new TLDs have been explosively increased. Hence, as illustrated in FIG. 9, the gTLDs having been enacted after 2013 are particularly distinguished as "New gTLDs" in sometimes.

FIG. 10 is a diagram illustrating examples of calculating the domain name hierarchy based feature amount from the input domain name. The third feature amount acquisition unit 15 refers to the top-level domain type information (refer to FIG. 9) from the input domain name and the brand domain name identified by the first feature amount acquisition unit 13 to be visually most similar to the input domain name, and extracts the top-level domains and the type information thereof as the feature amount.

In the example with the sequential number "1" in FIG. 10, the third feature amount acquisition unit 15 extracts the top-level domain ".test" from the input domain name "example ログイン.test" as the top-level domain of the input domain name. In the example with the sequential number "1" in FIG. 10, the third feature amount acquisition unit 15 identifies the type of the top-level domain ".test" as the "Legacy gTLD" from the example with sequential number "2" in FIG. 9.

Any similar brand domain names are not available for the input domain name "example ログイン.test" when the whole character string is taken into consideration. As a result, in the example with the sequential number "1" in FIG. 10, the third feature amount acquisition unit 15 enters that the "top-level domain of the most similar brand domain name" when the whole character string is taken into consideration is "not available" and the "top-level domain type of the brand domain name" is also "not available," in association with the input domain name "example ログイン.test."

When the partial character string is taken into consideration, "example.test" is identified as the brand domain name most similar to the input domain name "example ログイン.test". As a result, in the example with the sequential number "1" in FIG. 10, the third feature amount acquisition unit 15 enters that the "top-level domain of the most similar brand domain name" when the partial character string is taken into consideration is ".test" and the "top-level domain type of the brand domain name" is "Legacy gTLD," in association with the input domain name "example ログイン.test."

The probability inference unit 16 infers a degree that the input domain name is wrongly recognized as the brand domain name based on the feature amounts acquired by the feature amount acquisition unit 100 and a training model. The training model outputs the degree that the input domain name is wrongly recognized as the brand domain name as a response to input of the feature amount.

The probability inference unit 16 preliminarily generates the training model by learning, as training data, the feature amount of a known malignant domain name visually similar to a brand domain name and a degree that the malignant domain name is wrongly recognized as the brand domain name.

The probability inference unit 16 infers the degree that the input domain name is wrongly recognized as the brand domain name using the training model, and a feature amount that integrates a part or the whole of the feature amounts that are acquired by the first feature amount acquisition unit 13, the second feature amount acquisition unit 14, and the third feature amount acquisition unit 15. The probability inference unit 16 infers a probability that the input domain name is wrongly recognized as the brand domain name.

FIG. 11 is a diagram illustrating the examples of the integration of the feature amounts acquired by the feature amount acquisition unit from the input domain name. For example, the probability inference unit 16 integrates, in association with each of the input domain names described in FIG. 2, the visual similarity based feature amount (refer to FIG. 6) acquired by the first feature amount acquisition unit 13, the brand information based feature amount (refer to FIG. 8) acquired by the second feature amount acquisition unit 14, and the domain name hierarchy based feature amount (refer to FIG. 10) acquired by the third feature amount acquisition unit 15.

Specifically, in the example with the sequential number "1" in FIG. 11, the probability inference unit 16 extracts, with respect to the input domain name "example ログイン.test," the "similarity to the most similar brand domain name when the whole character string is taken into consideration" and the "similarity to the most similar brand domain name when the partial character string is taken into consideration" (refer to FIG. 6) as the visual similarity based feature amount. The probability inference unit 16 extracts, as the brand information based feature amount, the "popularity order of the most similar brand domain name when the whole character string is taken into consideration (in the world)," the "popularity order of the most similar brand domain name when the whole character string is taken into consideration (in the country)," the "popularity order of the most similar brand domain name when the partial character string is taken into consideration (in the world)," and the "popularity order of the most similar brand domain name when the partial character string is taken into consideration (in the country)" (refer to FIG. 8). The probability inference unit 16 extracts, as the domain name hierarchy based feature amount, the "top-level domain of the input domain name," the "top-level domain type of the input domain name," the "top-level domain of the most similar brand domain name when the whole character string is taken into consideration," the "top-level domain type of the most similar brand domain name when the whole character string is taken into consideration," the "top-level domain of the most similar brand domain name when the partial character string is taken into consideration," and the "top-level domain type of the most similar brand domain name when the partial character string is taken into consideration" (refer to FIG. 10). In each example in FIG. 11, the probability inference unit 16 integrally uses the extracted feature amounts.

The probability to be calculated by the probability inference unit 16 is the probability that a user wrongly recognizes the objective domain name as the brand domain name. The preliminarily surveyed result on probability of wrong recognition of a certain domain name is used as training data (also called teacher data) used by a supervised mechanical learning method. For example, the probability is obtained by performing a questionnaire investigation to investigate a certain domain name and a brand domain name recognized as the certain domain name.

FIG. 12 is a diagram illustrating examples of the training data. In the example with sequential number "1" in FIG. 12, as a result of a questionnaire investigation in which the domain name "example ログイン.test" is shown to users was performed on "100 users" (the number of investigated users), the number of users who wrongly recognized the domain name as the similar brand domain name is "70," and the "ratio of the users who perform wrong recognition" is "0.7 (=70/100)." As described above, in the embodiment, the number of users who wrongly recognize the domain name as the similar brand domain name is obtained with respect to a plurality of arbitrary domain names to obtain the ratio of the users who perform wrong recognition. The results are used as the training data.

The probability inference unit 16 inputs the training data illustrated in FIG. 12 and the feature amounts illustrated in FIG. 11, and applies a known supervised mechanical learning technique to generate the training model. Examples of applicable supervised mechanical learning technique include any methods that can perform binary classification with probability and regression estimation methods that directory estimate probabilities. For example, a support vector machine, a random forest, and a logistic regression are applicable. The supervised mechanical learning technique applied to the embodiment is not limited to those examples.

FIG. 13 is a diagram illustrating examples of calculating the probability that a user wrongly recognizes test data (the input domain name) as the brand domain name. FIG. 13 illustrates the example in which the probability inference unit 16 calculates the probability that a user wrongly recognizes the input domain name as the brand domain name using a learned training model.

The probability inference unit 16 inputs the input domain name illustrated in FIG. 13 and the feature amounts illustrated in FIG. 11 into the generated training model to calculate the probability that a user wrongly recognizes the domain name as the brand domain name.

For example, in the example with the sequential number "1" in FIG. 13, the probability that the domain name is wrongly recognized as a brand domain name is calculated to "0.6" when " 例えログイン.test" is input as the domain data serving as test data.

The output unit 17 outputs a degree that the input domain name is wrongly recognized as the brand domain name, the degree being inferred by the probability inference unit 16. The output unit 17 is achieved by a display device such as a liquid crystal display, a printing device such as a printer, or an information communication device, for example. The output unit 17 may be a communication interface that exchanges various types of information between itself and other devices connected via a network, for example, and may transmit inference results of the probability inference unit 16 to external devices.

Processing Procedure of Inference Processing

Figure 14:
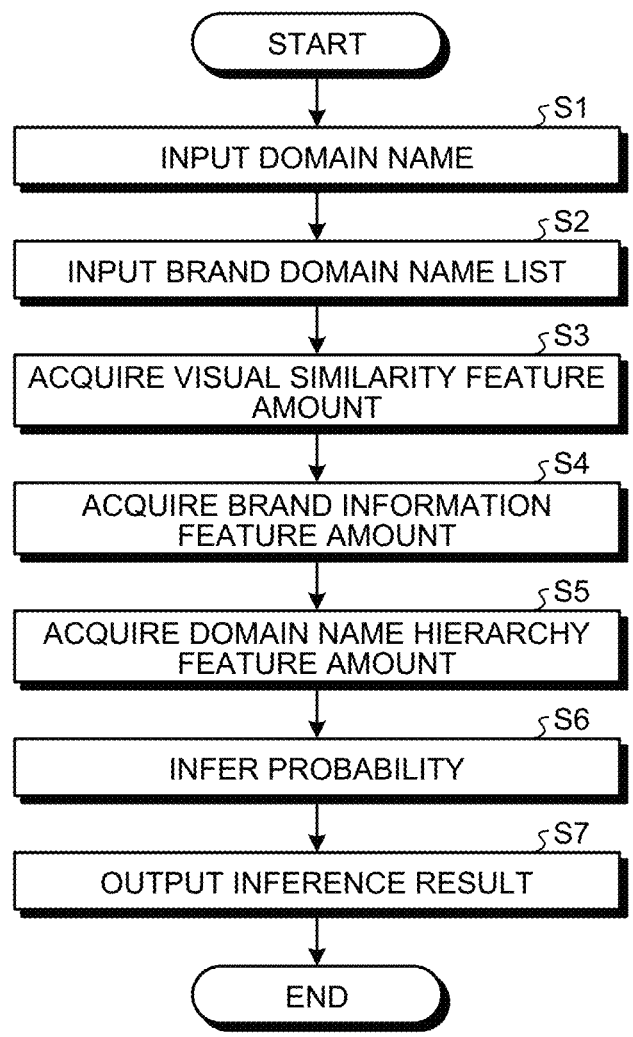
FIG. 14 is a diagram illustrating a processing procedure of inference processing according to the embodiment.

FIG. 14 is a diagram illustrating a processing procedure of the inference processing according to the embodiment. As illustrated in FIG. 14, the domain name input unit 11 receives input of an input domain name and inputs the input domain name into the feature amount acquisition unit 100 (step S1). The brand domain name list input unit 12 receives input of the brand domain name list and inputs the brand domain name list into the feature amount acquisition unit 100 (step S2).

In the feature amount acquisition unit 100, the first feature amount acquisition unit 13 calculates the visual similarity based feature amount from the combinations of the input domain name and each domain name in the brand domain name list (step S3). The second feature amount acquisition unit 14 extracts the evaluation information about the brand domain name visually most similar to the input domain name from external public information, and acquires the extracted evaluation information as the brand information based feature amount (step S4). The third feature amount acquisition unit 15 acquires, as the domain name hierarchy based feature amount, the type information about the top-level domain extracted from the input domain name, and the type information about the top-level domain extracted from the brand domain name visually most similar to the input domain name (step S5).

The probability inference unit 16 infers a degree (probability) that the input domain name is wrongly recognized as the brand domain name based on the feature amounts acquired by the feature amount acquisition unit 100 and the training model (step S6). The output unit 17 outputs the inference result of the probability inference unit 16 (step S7).

Advantageous Effects of Embodiment

As described above, the inference device 10 according to the embodiment acquires the similarities between the input domain name and each domain name indicated in the brand domain name list as the feature amounts, and infers a degree that the input domain name is wrongly recognized as the brand domain name based on the acquired feature amounts and the training model that outputs a degree that the input domain name is wrongly recognized as the brand domain name as a response to input of the feature amount. The inference device 10 infers a probability that a user wrongly recognizes an IDN serving as the analysis object as a brand domain name. The inference device 10 can identify the brand domain name visually similar to an arbitrary IDN serving as the analysis object and further infer a probability that a user is deceived by wrongly recognizing, as the brand domain name, the IDN serving as the analysis object.

In the inference device 10, the feature amount acquisition unit 100 acquires the whole or a part of the visual similarity based feature amount, the legitimate information based feature amount, and the domain name hierarchy based feature amount from the combinations of the input domain name and each domain name in the brand domain name list.

Specifically, the first feature amount acquisition unit 13 of the inference device 10 calculates similarities between the first image and the group of the second images, the first image being converted from at least a part of the character string representing the input domain name, the second image being converted from at least a part of the character string representing the domain name in the brand domain name list. The first feature amount acquisition unit 13 acquires the legitimate domain name corresponding to the highest similarity in the similarities as the brand domain name visually most similar to the input domain name. The first feature amount acquisition unit 13 acquires the highest similarity in the similarities as the visual similarity based feature amount of the input domain name.

The inference device 10 can detect not only the IDN generated by replacing a partial character of the brand domain name but also the IDN generated by combining the brand domain included in the brand name and an arbitrary word.

In the inference device 10, the second feature amount acquisition unit 14 extracts the evaluation information about the brand domain name visually most similar to the input domain name from external public information, and acquires the extracted evaluation information as the brand information based feature amount. The inference device 10 can take into consideration whether the IDN serving as the analysis object is generated to be similar to a more popular brand domain name.

In the inference device 10, the third feature amount acquisition unit 15 acquires, as the domain name hierarchy based feature amount, the type information about the top-level domain extracted from the input domain name and the type information about the top-level domain extracted from the brand domain name visually most similar to the input domain name. The inference device 10 can take into consideration whether the IDN serving as the analysis object uses the same top-level domain or second-level domain as that of a brand domain name, and whether the IDN serving as the analysis object uses a top-level domain or second-level domain that is more simply acquired.

In the inference device 10, the probability inference unit 16 infers the degree that the input domain name is wrongly recognized as the brand domain name using the learned training model, and the feature amount that integrates the whole or a part of the visual similarity based feature amount of the input domain name, the brand information based feature amount, and the domain name hierarchy based feature amount acquired by the feature amount acquisition unit 100. The inference device 10 can infer the IDN that causes users to be more easily deceived as one having a high probability based on a tendency of the domain names confirmed to cause users to be easily deceived, thereby making it possible to perform appropriate probability inference.

System Configuration, and the Like

The constituent elements of the device illustrated in the accompanying drawings are functionally conceptual and need not to be physically structured as illustrated. The specific form of distribution and integration of the devices are not limited to those illustrated in the drawings. The whole or a part of the devices can be structured by being functionally or physically distributed or integrated based on any unit in accordance with the various loads and usage conditions, and the like. The whole or any part of the processing functions performed by the devices are achieved by a CPU and a program that is analyzed and executed by the CPU, or can be achieved as hardware by wired logic.

Out of the pieces of processing described in the embodiment, all or a part of the processing described as being automatically performed can also be manually performed or all or a part of the processing described as being manually performed can also be automatically performed by a known method. The processing procedures, control procedures, specific names, and information including various types of data and parameters that are described and illustrated in the specification and the accompanying drawings can be arbitrary modified unless otherwise described.

Program

Figure 15:
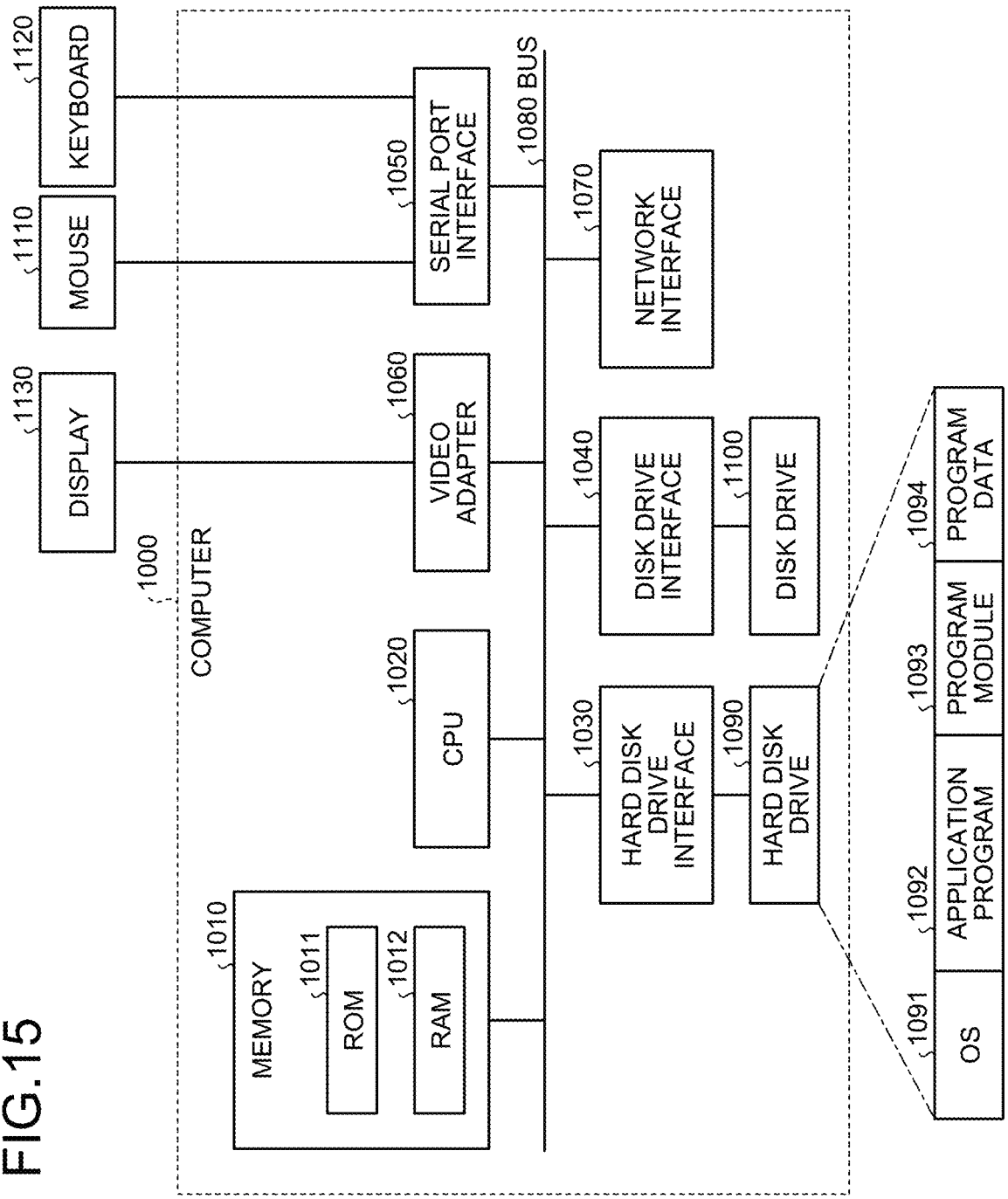
FIG. 15 is a diagram illustrating an example of a computer that achieves the inference device in the embodiment as a result of executing a program.

FIG. 15 is a diagram illustrating an example of a computer that achieves the inference device 10 as a result of execution of a program. This computer 1000 has a memory 1010 and a CPU 1020, for example. The computer 1000 has a hard disk drive interface 1030, a disk drive interface 1040, a serial port interface 1050, a video adapter 1060, and a network interface 1070. Those components are connected by a bus 1080.

The memory 1010 includes a ROM 1011 and a RAM 1012. The ROM 1011 stores therein a boot program such as a basic input output system (BIOS), for example. The hard disk drive interface 1030 is connected to a hard disk drive 1090. The disk drive interface 1040 is connected to a disk drive 1100. For example, a detachable storage medium such as a magnetic disk or an optical disc is inserted into the disk drive 1100. The serial port interface 1050 is connected to a mouse 1110 and a keyboard 1120, for example. The video adapter 1060 is connected to a display 1130, for example.

The hard disk drive 1090 stores therein an operating system (OS) 1091, an application program 1092, a program module 1093, and program data 1094, for example. The program defining pieces of processing of the inference device 10 is implemented as the program module 1093 in which computer executable codes are written. The program module 1093 is stored in the hard disk drive 1090, for example. For example, the program module 1093 for performing the same processing as the functional structure of the inference device 10 is stored in the hard disk drive 1090. The hard disk drive 1090 may be replaced with a solid state drive (SSD).

The setting data used in the processing in the embodiment is stored, as the program data 1094, in the memory 1010 or the hard disk drive 1090, for example. The CPU 1020 reads the program module 1093 and the program data 1094 that are stored in the memory 1010 and the hard disk drive 1090 to the RAM 1012 as needed, and executes the program module 1093 and the program data 1094.

The program module 1093 and the program data 1094 are not limited to being stored in the hard disk drive 1090. The program module 1093 and the program data 1094 may be stored in the detachable storage medium and read out by the CPU 1020 via the disk drive 1100, for example. Alternatively, the program module 1093 and the program data 1094 may be stored in another computer connected via a network (e.g., LAN, or a wide area network (WAN)). The program module 1093 and the program data 1094 may be read out by the CPU 1020 from the other computer via the network interface 1070.

The embodiment to which the invention made by the inventor is applied has been described. The description by the embodiment and drawings that constitute a part of the disclosure of the invention do not limit the invention. Other embodiments, examples, and operation techniques made by those skilled in the art are all included in the scope of the invention, for example.

REFERENCE SIGNS LIST 10 inference device
11 domain name input unit
12 brand domain name list input unit
13 first feature amount acquisition unit
14 second feature amount acquisition unit
15 third feature amount acquisition unit
16 probability inference unit
17 output unit
100 feature amount acquisition unit

The invention claimed is:

1. An inference method comprising:
acquiring similarities between a domain name serving as an analysis object and each domain name indicated in a legitimate domain name list as feature amounts; and
inferring a degree that the domain name serving as the analysis object is wrongly recognized as a legitimate domain name based on the feature amounts acquired at the acquiring and a training model that outputs, as a response to input of the feature amounts, a degree that the domain name serving as the analysis object is wrongly recognized as the legitimate domain name, by processing circuitry.

2. The inference method according to claim 1, wherein, at the acquiring, from combinations of the domain name serving as the analysis object and each domain name in the legitimate domain name list, whole or a part of a visual similarity based feature amount, a legitimate information based feature amount, and a domain name hierarchy based feature amount is acquired.

3. The inference method according to claim 2, wherein the acquiring includes calculating similarities between a first image and a group of second images, the first image being converted from at least a part of a character string representing the domain name serving as the analysis object, the second image being converted from at least a part of a character string representing the domain name in the legitimate domain name list, acquiring the legitimate domain name corresponding to the highest similarity in the similarities as the legitimate domain name visually most similar to the domain name serving as the analysis object, and acquiring the highest similarity in the similarities as the visual similarity based feature amount of the domain name serving as the analysis object.

4. The inference method according to claim 3, wherein the acquiring includes extracting evaluation information about the legitimate domain name visually most similar to the domain name serving as the analysis object from external public information, and acquiring the extracted evaluation information as the legitimate information based feature amount.

5. The inference method according to claim 4, wherein the acquiring includes acquiring, as the domain name hierarchy based feature amount, type information about a top-level domain extracted from the domain name serving as the analysis object and type information about a top-level domain extracted from the legitimate domain name visually most similar to the domain name serving as the analysis object.

6. The inference method according to claim 5, wherein the inferring includes: preliminarily generating the training model that has learned, as training data, a feature amount of a known malignant domain name visually similar to a legitimate domain name and a degree that the known malignant domain name is wrongly recognized as the legitimate domain name, and inferring a degree that the domain name serving as the analysis object is wrongly recognized as the legitimate domain name using the training model and a feature amount that integrates whole or a part of the feature amounts that are acquired at the calculating, the extracting, and the acquiring.

7. An inference device comprising:
a memory; and
processing circuitry coupled to the memory and configured to:
acquire similarities between a domain name serving as an analysis object and each domain name indicated in a legitimate domain name list as feature amounts, and
infer a degree that the domain name serving as the analysis object is wrongly recognized as a legitimate domain name based on the feature amounts acquired and a training model that outputs, as a response to input of the feature amounts, a degree that the domain name serving as the analysis object is wrongly recognized as the legitimate domain name.

8. A non-transitory computer-readable recording medium storing therein an inference program that causes a computer to execute a process comprising:
acquiring similarities between a domain name serving as an analysis object and each domain name indicated in a legitimate domain name list as feature amounts; and
inferring a degree that the domain name serving as the analysis object is wrongly recognized as a legitimate domain name based on the feature amounts acquired at the acquiring and a training model that outputs, as a response to input of the feature amounts, a degree that the domain name serving as the analysis object is wrongly recognized as the legitimate domain name.

* * * * *